(12) United States Patent
Tsai et al.

(10) Patent No.: US 10,801,914 B2
(45) Date of Patent: Oct. 13, 2020

(54) METHOD FOR DETECTING DETERIORATION DEFECT OF STRUCTURAL PART USING STRUCTURAL UNIT

(71) Applicant: INDUSTRIAL TECHNOLOGY RESEARCH INSTITUTE, Hsinchu (TW)

(72) Inventors: Yao-Long Tsai, Kaohsiung (TW); Li-Hua Wang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 176 days.

(21) Appl. No.: 16/111,033

(22) Filed: Aug. 23, 2018

(65) Prior Publication Data

US 2019/0145850 A1    May 16, 2019

Related U.S. Application Data

(60) Provisional application No. 62/584,636, filed on Nov. 10, 2017.

(30) Foreign Application Priority Data

Mar. 7, 2018    (TW) .............................. 107107654 A

(51) Int. Cl.
*G01N 29/44*    (2006.01)
*G01M 3/24*    (2006.01)
(Continued)

(52) U.S. Cl.
CPC .............. *G01M 3/243* (2013.01); *F17D 5/02* (2013.01); *G01M 3/2807* (2013.01);
(Continued)

(58) Field of Classification Search
CPC .. G01M 3/243; G01M 3/2807; G01M 5/0025; G01M 5/0033; G01M 5/0066;
(Continued)

(56) References Cited

U.S. PATENT DOCUMENTS 5,327,358 A * 7/1994 Stubbs ................... G01H 17/00
                                                                 702/36
5,375,471 A    12/1994 Blazic et al.
(Continued)

FOREIGN PATENT DOCUMENTS

CN    101034053 A    9/2007
CN    101539493 A    9/2009
(Continued)

OTHER PUBLICATIONS

TW Office Action dated Dec. 28, 2018 as received in Application No. 107107654.
(Continued)

*Primary Examiner* — Suman K Nath
(74) *Attorney, Agent, or Firm* — Maschoff Brennan

(57) ABSTRACT

A method for detecting a deterioration defect of a structural part using a structural unit includes: defining a first base structural unit and obtaining N first base modal parameters of the first base structural unit; detecting a respective one of M first subject structural units of a subject structural part by each of M first sensors to obtain N first actual modal parameters of each of the M first subject structural units; calculating N first subject modal parameters of each of the M first subject structural units according to the N first actual modal parameters of each of the M first subject structural units and M*N first predetermined ratios; and comparing the N first subject modal parameters of each of the M first subject structural units to the N first base modal parameters
(Continued)

to determine whether each of the M first subject structural units has a deterioration defect.

8 Claims, 8 Drawing Sheets

(51) Int. Cl.
| | | |
|---|---|---|
| G01M 3/28 | (2006.01) | |
| G01M 5/00 | (2006.01) | |
| F17D 5/02 | (2006.01) | |
| G01M 7/00 | (2006.01) | |
| G01N 29/04 | (2006.01) | |
| F17D 1/08 | (2006.01) | |
| F16L 55/07 | (2006.01) | |

(52) U.S. Cl.
CPC ........ *G01M 5/0025* (2013.01); *G01M 5/0033* (2013.01); *G01M 5/0066* (2013.01); *G01M 7/00* (2013.01); *G01N 29/043* (2013.01); *G01N 29/4427* (2013.01); *G01N 29/4472* (2013.01); *F16L 55/07* (2013.01); *F16L 2201/30* (2013.01); *F17D 1/08* (2013.01); *G01N 29/045* (2013.01); *G01N 2291/0258* (2013.01); *G01N 2291/044* (2013.01); *G01N 2291/2634* (2013.01)

(58) Field of Classification Search
CPC . G01M 7/00; G01N 29/4472; G01N 29/4427; G01N 29/043; G01N 29/045; G01N 2291/0258; G01N 29/044; G01N 29/2634; F17D 5/02; F17D 1/08; F16L 2201/30; F16L 55/07
See application file for complete search history.

(56) References Cited

U.S. PATENT DOCUMENTS

| | | | | |
|---|---|---|---|---|
| 5,652,386 | A * | 7/1997 | Dimarogonas | .......... G01H 1/16 |
| | | | | 702/56 |
| 6,062,083 | A | 5/2000 | Dunegan | |
| 8,296,083 | B2 | 10/2012 | Martin | |
| 2006/0062343 | A1 | 3/2006 | Perng et al. | |
| 2012/0188078 | A1 | 7/2012 | Soles et al. | |
| 2012/0204646 | A1 | 8/2012 | Lee et al. | |
| 2015/0160169 | A1 | 6/2015 | Hall et al. | |
| 2015/0185186 | A1 | 7/2015 | Han et al. | |
| 2016/0011072 | A1 * | 1/2016 | Hale | ...................... G01M 3/24 |
| | | | | 702/48 |
| 2016/0146648 | A1 | 5/2016 | Patel et al. | |
| 2017/0030863 | A1 | 2/2017 | Holmes et al. | |

FOREIGN PATENT DOCUMENTS

| | | |
|---|---|---|
| CN | 103674545 A | 3/2014 |
| CN | 104535323 A | 4/2015 |
| CN | 103049670 B | 8/2015 |
| CN | 104897353 A | 9/2015 |
| TW | 198097 B | 1/1993 |
| TW | I243385 B | 11/2005 |
| TW | I449883 B | 8/2014 |
| TW | I572327 B | 3/2017 |

OTHER PUBLICATIONS

TW Office Action in application No. 107107654 dated Apr. 12, 2019.
Artiticial Neural Network for the Classification of Steel Hollow pipe, N mohamad, Hafizawati, R.A Siregar, M.Hariharan and Fauziah Mat, Proceedings of International Conference on Applications and Design in Mechanical Engineering (ICADME)Oct. 11-13, 2009, Batu Ferringhi, Penang, Malaysia, 9B-1-9B-4.
Detection of pipe wall-thinning based on change of natural frequencies of shell vibration modes, Soonwoo Han , Jinho Park , To Kang, 19thWorld Conference on Non-Destructive Testing, Jun. 13, 2016, 1-8.
Frequency-based experimental and theoretical identification of multiple cracks in straight pipes filled with fluid, S.M. Murigendrappa, S.K. Maiti, H.R. Srirangarajan, NDT&E International 37 (Sep. 2004) 431-438.
Identification of wall-thinning and cracks in pipes utilizing vibration modes and wavelets, M. El-Gebeily ,Y.A. Khulief, Applied Mathematical Modelling 40 (May 2016) 5335-5348.
Inexpensive Pipelines Health Evaluation Techniques Based on Resonance Determination, Numerical Simulation and Experimental Testing, Waheed Sami Abushanab, Engineering, Apr. 2013, 5, 337-343.
TW Office Action dated Jun. 19, 2018 in application No. 106140912.
CN Office Action in Application No. 201810436422.1 dated May 6, 2020.

* cited by examiner

METHOD FOR DETECTING DETERIORATION DEFECT OF STRUCTURAL PART USING STRUCTURAL UNIT

CROSS-REFERENCE TO RELATED APPLICATIONS

This non-provisional application claims priority under 35 U.S.C. § 119(a) on Patent Application No(s). 107107654 filed in Taiwan, R.O.C. on Mar. 7, 2018, claims priority under 35 U.S.C. § 119(e) on Provisional Application No(s). 62/584,636 filed in U.S. on Nov. 10, 2017, the entire contents of which are hereby incorporated by reference.

TECHNICAL FIELD

The disclosure relates to a method for detecting a deterioration defect of a structural part using a structural unit.

BACKGROUND

Leakage of industrial pipelines occurs because of abnormalities and results in serious disasters. One cause of the abnormalities in industrial pipelines is related to human-induced factors, and another cause of the abnormalities is related to material deterioration occurring in pipelines or equipment. Although manufacturers from various countries have developed a monitoring system in this regard, the concept of such monitoring system is based on a monitoring of process parameters, an analysis of operating status and performance. The kind of monitoring system still lacks the capabilities of detecting deterioration.

The main technical shortcomings of the present industrial pipeline safety monitoring are summarized as follows. First, the environmental sensors or process-parameter sensors set up at the site are used for the process monitoring to regulate the production process, and lack appropriate safety diagnosis modules for the logical judgment analysis. Second, the present monitoring technique lacks the capability of a remote monitoring for sensing deterioration, and commonly used non-destructive detection technology is only applicable to the position of partial pipeline where the sensors are disposed. This type of detection technology can only be used for detecting when the pipeline is broken and fluid leaks, and fails to send out an early warning signal when deterioration occurs. Third, the operating environment of industrial plants varies due to systems, structures and components. The sensors must have the durability against the high temperature and the high humidity of the environment as well as long-term monitoring.

In other words, it is not easy to instantaneously detect damage or deterioration of the pipeline due to the limitations of the conventional pipeline inspection methods and technique. Accordingly, the proper time for immediately performing maintenance and dealing with contingency is missed. Moreover, since a network of a pipeline system is complicated, it is difficult to construct an early-warning system for detecting deterioration of pipeline caused by a long-term usage. Therefore, in the field of industrial safety, it is necessary to develop technologies related to diagnosis and monitoring so as to establish a complete monitoring system for the issue of pipeline safety.

SUMMARY

A method for detecting a deterioration defect of a structural part using a structural unit is disclosed according to one embodiment of the present disclosure. The method includes the following steps: defining a first base structural unit and obtaining N first base modal parameters of the first base structural unit; detecting a respective one of M first subject structural units included in a subject structural part by each of M first sensors disposed at the subject structural part, so as to obtain N first actual modal parameters of each of the M first subject structural units, wherein a structural type of each of the M first subject structural units is identical to a structural type of the first base structural unit; calculating N first subject modal parameters of each of the M first subject structural units by a processor according to the N first actual modal parameters of each of the M first subject structural units and M*N first predetermined ratios stored in a database, with the processor electrically connected to the M first sensors; and comparing the N first subject modal parameters of each of the M first subject structural units to the N first base modal parameters by the processor, so as to determine whether each of the M first subject structural units has a deterioration defect; wherein the M*N first predetermined ratios are related to the N first base modal parameters and M*N first predetermined modal parameters.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
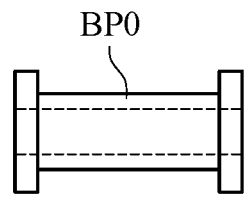
FIG. 1 is a diagram of a first base structural unit according to one embodiment of the present disclosure.
Figure 2:
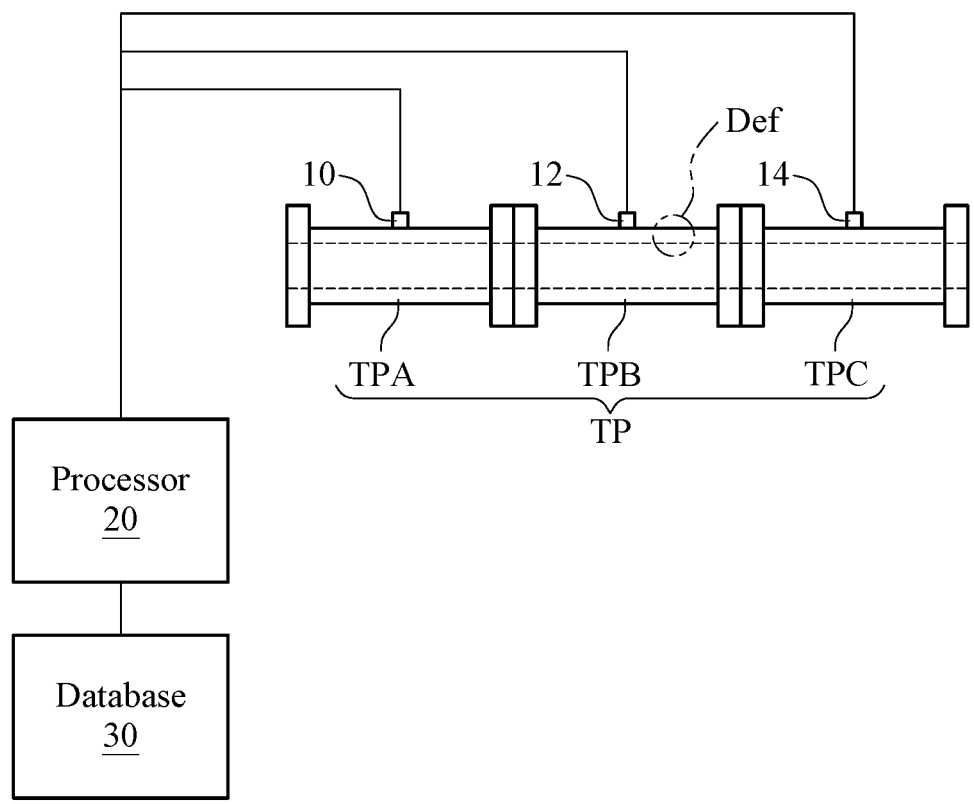
FIG. 2 is a diagram of a subject structural part according to one embodiment of the present disclosure.
Figure 3:
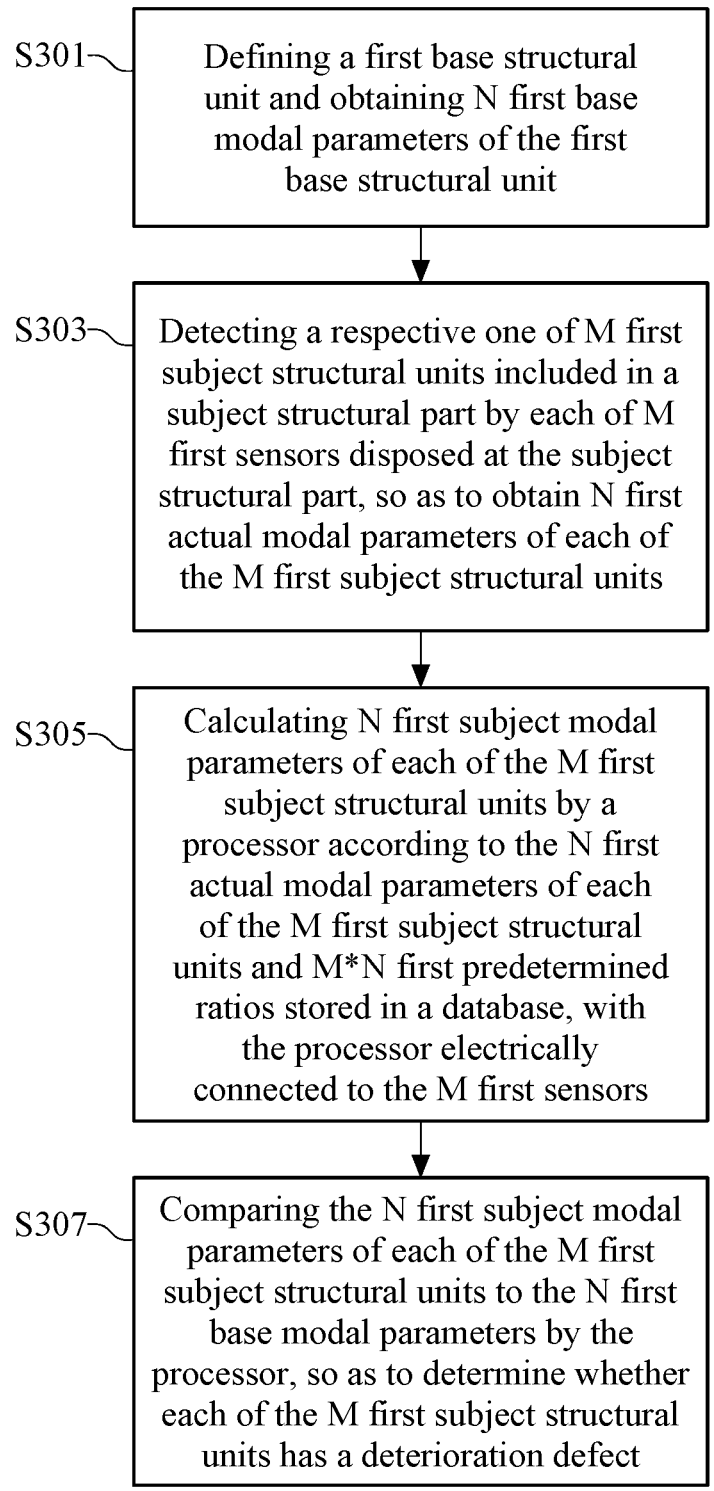
FIG. 3 is a flow chart of a method for detecting a deterioration defect of the structural part using structural units according to one embodiment of the present disclosure.

Please refer to FIG. 1 to FIG. 3. FIG. 1 is a diagram of a first base structural unit according to one embodiment of the present disclosure, and FIG. 2 is a diagram of a subject structural part according to one embodiment of the present disclosure. FIG. 3 is a flow chart of a method for detecting a deterioration defect of the structural part using structural units according to one embodiment of the present disclosure. As shown in figures, first of all, in step S301, a first base structural unit BP0 is defined and a plurality of first base modal parameters P01-P05 of the first base structural unit BP0 are obtained. In practice, for any kind of structural parts with their own respective modals, it is possible to define a proper size of a structural unit by detecting modals of a structural part and regions in the structural part to be monitored during the operation of modal identifications of the structural part.

In step S303, each of a plurality of first sensors 10, 12 and 14, disposed at the subject structural part TP, detects a respective one of the first subject structural units TPA-TPC included in the subject structural part TP, so as to obtain a plurality of first actual modal parameters of each of first subject structural units TPA-TPC. In this embodiment, the first subject structural unit TPA has a plurality of first actual modal parameters PA1-PA5, the first subject structural unit TPB has a plurality of first actual modal parameters PB1-PB5, and the first subject structural unit TPC has a plurality of first actual modal parameters PC1-PC5.

In this embodiment, a structural type of each of the first subject structural units is identical to a structural type of the first base structural unit. As shown in FIG. 1 and FIG. 2, each of the first subject structural units TPA-TPC has the same structural type of linear pipe and the same size as the first base structural unit BP0. However, the above embodiment is given for illustration merely, and the present disclosure is not limited to the above embodiment. In step S305, a processor 20, electrically connected to the first sensors 10-14, calculates a plurality of first subject modal parameters TA1-TA5, TB1-TB5 and TC1-TC5 of the first subject structural units TPA, TPB and TPC respectively according to the first actual modal parameters PA1-PA5, PB1-PB5 and PC1-PC5 of the first subject structural units TPA-TPC and a plurality of first predetermined ratios R1-R15 stored in a database 30. In step S307, the processor 20 compares each of first subject modal parameters TA1-TA5, TB1-TB5 and TC1-TC5 to the first base modal parameters P01-P05, so as to determine whether each of the first subject structural units has a deterioration defect.

Figure 4:
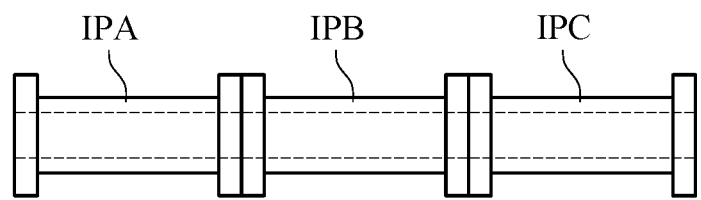
FIG. 4 is a diagram of a plurality of first simulated structural units according to one embodiment of the present disclosure.

In a practical example, the aforementioned modal parameters represent characteristic frequencies of the structural units. For example, each of the first base modal parameters P01-P05 includes a respective characteristic frequency of the first base structural unit BP0. The first actual modal parameters PA1-PA5, PB1-PB5 and PC1-PC5 include frequencies of the first subject structural units TPA, TPB and TPC respectively. In practice, modal parameters are obtained by vibrating the structural units using a vibrator with a transformation of time to frequency domain. In this embodiment, the first predetermined ratios R1-R15 are related to the first base modal parameters P01-P05 and a plurality of first predetermined modal parameters IPA1-IPA5, IPB1-IPB5 and IPC1-IPC5. Please refer to FIG. 4, which is a diagram of a plurality of first simulated structural units according to one embodiment of the present disclosure. In one embodiment, the method for detecting deterioration defect of the structural part further includes the following steps: obtaining the first predetermined modal parameters IPA1-IPA5, IPB1-IPB5 and IPC1-IPC5 from the first simulated structural units IPA, IPB and IPC respectively, and obtaining the first predetermined ratios R1-R15 by dividing the first base modal parameters P01-P05 by each of the first predetermined modal parameters IPA1-IPA5, IPB1-IPB5 and IPC1-IPC5. (e.g. R1=P01/IPA1).

Specifically, the processor 20 performs a calculation that the first base modal parameters P01-P05 is divided by the first predetermined modal parameters IPA1-IPA5 respectively, so as to obtain the first predetermined ratios R1-R5, the first base modal parameters P01-P05 is divided by the first predetermined modal parameters IPB1-IPB5 respectively, so as to obtain the first predetermined ratios R6-R10, and the first base modal parameters P01-P05 is divided by the first predetermined modal parameters IPC1-IPC5 respectively, so as to obtain the first predetermined ratios R10-R15. In practice, the first predetermined ratios R1-R15 are stored in the database 30 in advanced, and adapted to be multiplied with the first actual modal parameters PA1-PA5, PB1-PB5 and PC1-PC5 respectively by the processor 20, so as to obtain the first subject modal parameters TA1-TA5 of the first subject structural unit TPA, the first subject modal parameters TB1-TB5 of the first subject structural unit TPB, the first subject modal parameters TC1-TC5 of the first subject structural unit TPC. Then, the processor 20 separately determines whether each of the first subject modal parameters TA1-TA5, TB1-TB5 and TC1-TC5 match the first base modal parameters P01-P05. For example, the processor 20 determines whether the first subject modal parameters TA1-TA5 match the first base modal parameters P01-P05 respectively. If the first subject modal parameters match the first base modal parameters, the processor 20 determines that the first subject structural units do not have deterioration defects. If the first subject modal parameters do not match the first base modal parameters, the processor 20 determines that the first subject modal parameters have deterioration defects.

In this embodiment, a structural type of each of the first simulated structural units IPA-IPC is identical to a structural type of the first base structural unit BP0. Specifically, each of the first simulated structural units IPA-IPC has the same physical characteristics as the first base structural unit BP0. For example, each of the first simulated structural units IPA-IPC has the same structural type of linear pipe with identical size, density and rigidity as the first base structural unit BP0. In the method for detecting the deterioration defect of the structural part, subject modal parameters are derived by using the first predetermined ratios and actual modal parameters, and further a process of determining which structural unit has a deterioration defect is performed based on the comparison of the derived subject modal parameters and the base modal parameters. In other words, any region of the overall structural part is diagnosed by deriving a pure structural unit by using ratios. By using the kind of diagnosis, construction of customized database is reduced and the learning efficiency and experience sharing are improved. The number of structural units and the number of modal parameters given in the above embodiments are used merely for illustration, and the present disclosure is not limited to the above embodiments.

In one embodiment, the method for the detecting deterioration defect of the structural part further includes the following steps: obtaining the first predetermined modal parameters IPA1-IPA5, IPB1-IPB5 and IPC1-IPC5 respectively from the first subject structural units TPA, TPB and TPC before a first time point prior to a second time in which obtaining the first actual modal parameters PA1-PA5 of the first subject structural unit TPA, the first actual modal parameters PB1-PB5 of the first subject structural unit TPB and the first actual modal parameters PC1-PC5 of the first subject structural unit TPC, and further dividing each of the first predetermined modal parameters IPA1-IPA5, IPB1-IPB5 and IPC1-IPC5 by the first base modal parameters P01-P05, so as to obtain the first predetermined ratios R1-R15. The first time point is prior to the second time for a predetermined period of time ΔT. Specifically, before a first time point, the first predetermined modal parameters IPA1-IPA5, IPB1-IPB5 and IPC1-IPC5 are obtained respectively from the first subject structural units TPA, TPB and TPC. Before the first time point, each of the first subject structural units TPA-TPC is a perfect structural unit without deterioration defects. At least one of the first subject structural units TPA-TPC may has a deterioration defect due to some factors at a second time point prior to the first time point for the predetermined period of time ΔT. In other words, different from the aforementioned embodiments in which the first simulated structural units IPA-IPC are used to obtain first predetermined modal parameters, in this embodiment, the first predetermined modal parameters IPA1-IPA5, IPB1-IPB5 and IPC1-IPC5 are obtained respectively from the first subject structural units TPA, TPB and TPC before the first subject structural units TPA, TPB and TPC have deterioration defects. In this case, in this embodiment, it is not necessary to construct the first simulated structural units IPA-IPC. Thereby, the cost and time for constructing the extra simulated structural units are eliminated.

Figure 5A:
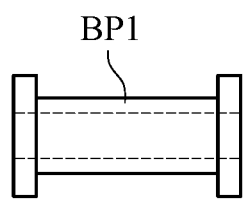
FIG. 5A is a diagram of a first base structural unit according another embodiment of the present disclosure.
Figure 5B:
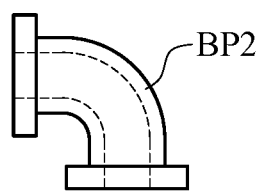
FIG. 5B is a diagram of a second base structural unit according to one embodiment of the present disclosure.
Figure 6:
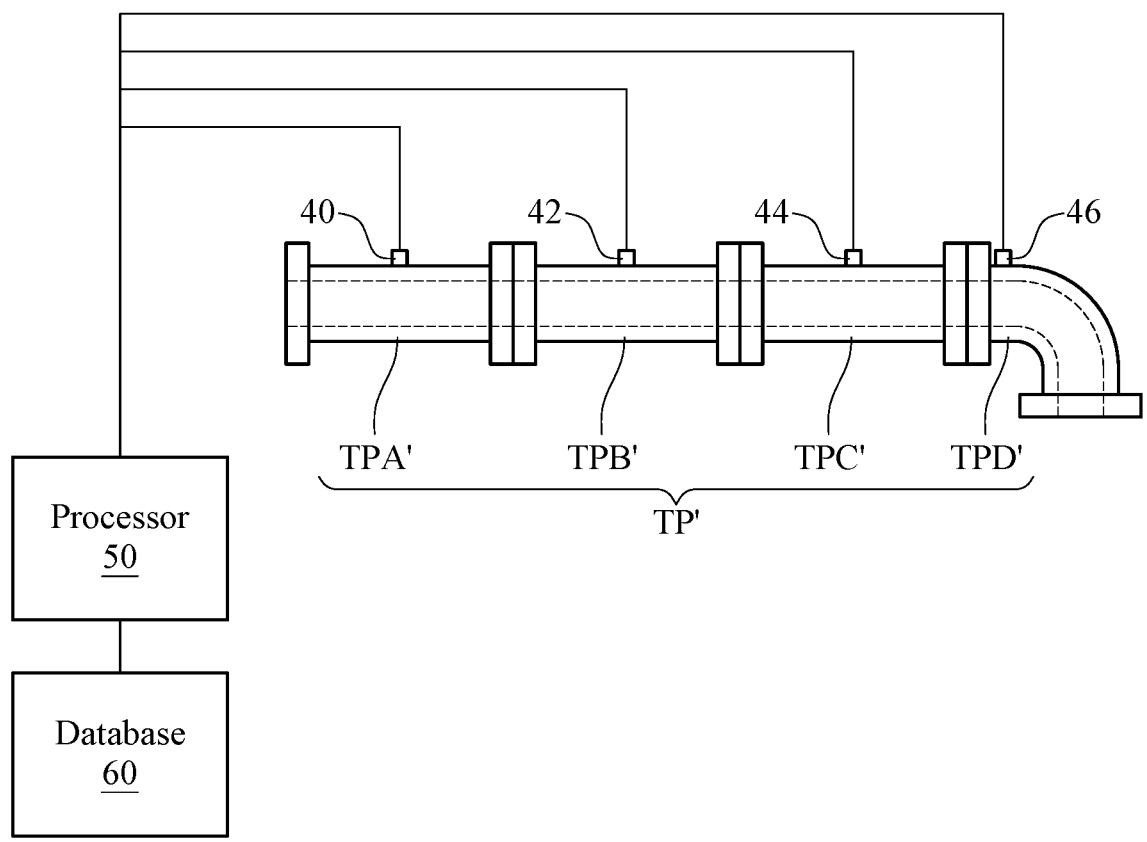
FIG. 6 is a diagram of a subject structural part according to another embodiment of the present disclosure.
Figure 7:
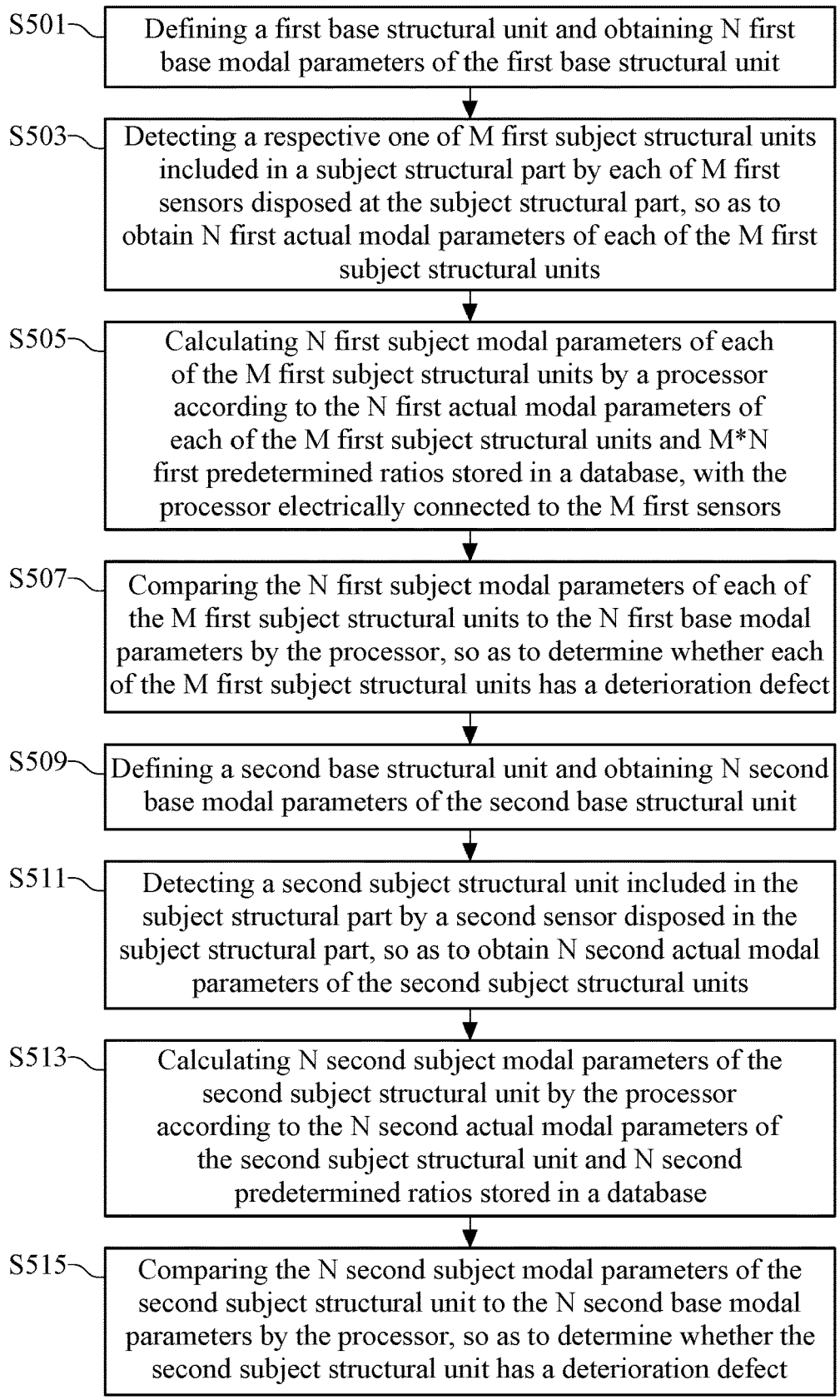
FIG. 7 is a flow chart of method for detecting deterioration defect of the structural part using structural units according to another embodiment of the present disclosure.

Please refer to FIG. 5A to FIG. 7. FIG. 5A is a diagram of a first base structural unit according to another embodiment of the present disclosure. FIG. 5B is a diagram of a second base structural unit according to one embodiment of the present disclosure. FIG. 6 is a diagram of a subject structural part according to another embodiment of the present disclosure. FIG. 7 is a flow chart of a method for detecting a deterioration defect of the structural part using structural units according to another embodiment of the present disclosure. The embodiments of FIG. 5A to FIG. 7 are similar to the embodiments of FIG. 1 to FIG. 3. Specifically, in step S501, a first base structural unit BP1 is defined (as shown in 5A) and a plurality of first base modal parameters P01-P05 are obtained from the first base structural unit BP1. In step S503, a plurality of first sensors 40, 42 and 44, disposed at the subject structural part TP', respectively detect the first subject structural units TPA', TPB' and TPC' included in the subject structural part TP', so as to obtain a plurality of first actual modal parameters of each of the first subject structural units. In this embodiment, the first subject structural unit TPA' has a plurality of first actual modal parameters PA1'-PA5'. The first subject structural unit TPB' has a plurality of first actual modal parameters PB1'-PB5'. The first subject structural unit TPC' has a plurality of first actual modal parameters PC1'-PC5'. In step S305, a processor 50, electrically connected to the first sensors 40-44, calculates the first subject modal parameters TA1'-TA5', TB1'-TB5' and TC1'-TC5' of the first subject structural units TPA', TPB' and TPC' according to first actual modal parameters PA1'-PA5' PB1'-PB5' and PC1'-PC5' of the first subject structural units TPA', TPB' and TPC' as well as a plurality of first predetermined ratios R1'-R15' stored in a database 60. In step S307, the processor 50 compares the first subject modal parameters TA1'-TA5' to the first base modal parameters P01-P05, compares the first subject modal parameters TB1'-TB5' to the first base modal parameters P01-P05, and compares the first subject modal parameters TC1'-TC5' to the first base modal parameters P01-P05, so as to determine whether each of the first subject structural units has a deterioration defect.

Different from the embodiments of FIG. 1 to FIG. 3, the method for detecting the deterioration defect of the structural part further includes: in step S509, a second base structural unit BP2 is defined (as shown in FIG. 5B) and a plurality of second base modal parameters P01'-P05' of the second base structural unit BP2 is obtained. In step S511, a second sensor 46, disposed on the subject structural part TP', detects a second subject structural unit TPD' included in the subject structural part TP' so as to obtain a plurality of second actual modal parameters PD1'-PD5' of the second subject structural unit TPD'. In step S511, the processor 50 calculates a plurality of second subject modal parameters TD1'-TD5' of the second subject structural unit TPD' according to the second actual modal parameters PD1'-PD5' of the second subject structural unit TPD' as well as second predetermined ratios R16'-R20' stored in the database 60. In step S515, the processor 50 compares the second subject modal parameters TD1'-TD5' to the second base modal parameters P01'-P05' respectively so as to determine whether the second subject structural unit TPD' has a deterioration defect.

Figure 8:
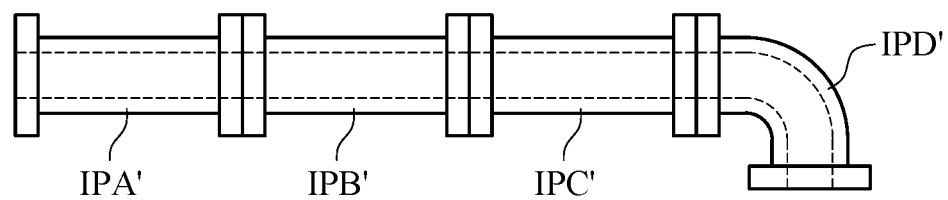
FIG. 8 is a diagram of first simulated structural units and a second simulated structural unit according to one embodiment of the present disclosure.

In practice, the first predetermined ratios R1'-R15' are related to the first base modal parameters P01-P05 and a plurality of first predetermined modal parameters IPA1'-IPA5', IPB1'-IPB5' and IPC1'-IPC5'. Please further refer to FIG. 8, which is a diagram of first simulated structural units and a second simulated structural unit according to one embodiment of the present disclosure. In one embodiment, the method for detecting the deterioration defect of the structural part further includes the following steps: obtaining the first predetermined modal parameters IPA1'-IPA5', IPB1'-IPB5' and IPC1'-IPC5' respectively from the first simulated structural units WA', IPB' and IPC', and obtaining the second predetermined modal parameters IPD1'-IPD5' from the second simulated structural unit IPD'. Then, the processor 50 divides the first base modal parameters P01~P05 by the first predetermined modal parameters IPA1'IPA5', divides the first base modal parameters P01-P05 by the first predetermined modal parameters IPB1'-IPB5' and divides the first base modal parameters P01-P05 by the first predetermined modal parameters IPC1'-IPC5', so as to obtain the first predetermined ratios R1-R15. Moreover, the processor 50 divides the second base modal parameters P01'-P05' by the second predetermined modal parameters IPD1'-IPD5' so as to obtain the second predetermined ratios R16-R20. In other words, in the embodiment, the second predetermined ratios R16'-R20' is related to the second base modal parameters P01'-P05' and the second predetermined modal parameters IPD1'-IPD5' obtained from the second simulated structural unit IPD'.

A structural type of the second simulated structural unit IPD' is identical to a structural type of the second base structural unit BP2, and the structural type of the second base structural unit BP2 is not identical to the structural type of the first base structural unit BP1. Specifically, the second base structural unit BP2 has the same type of bent pipe as the second simulated structural unit IPD' while the first base structural unit BP1 has the structural type of linear pipe. However, the present disclosure is not limited to the structural types of pipe mentioned in the above embodiment. The method for detecting the deterioration defect of the structural part is applicable to a structural part comprising a variety of structural units with their own structural types.

Steps of S301-S307 shown in FIG. 3 are performed for determining which one of structural units included in the structural part has the deterioration defect. However, in practice, it is still necessary for engineers to make a further determination, so as to accurately figure out a position and a degree of the deterioration defect existing in the structural unit.

Please refer back to FIG. 1 to FIG. 3. In one embodiment, the method for detecting the deterioration defect of the structural part further includes the following steps. When the processor 20 determines that one of the first subject structural units TPA-TPC has a deterioration defect, the processor 20 compares the actual modal parameters of the first subject structural unit having the deterioration defect to the first modal parameter information stored in the database 30, so as to determine a degree and a position of the deterioration defect. For example, assume that the processor 20 determines that the first subject structural unit TPB has a deterioration defect Def (as shown in FIG. 2), the processor 20 compares the first actual modal parameters PB1-PB5 to the first modal parameter information stored in the database 30. The first modal parameter information includes a plurality of sets of first comparison modal parameters, and each of the sets of first comparison modal parameters indicates a respective one of the deterioration defect of the position and other deterioration defects of other positions in the first subject structural unit TPB.

Figure 9:
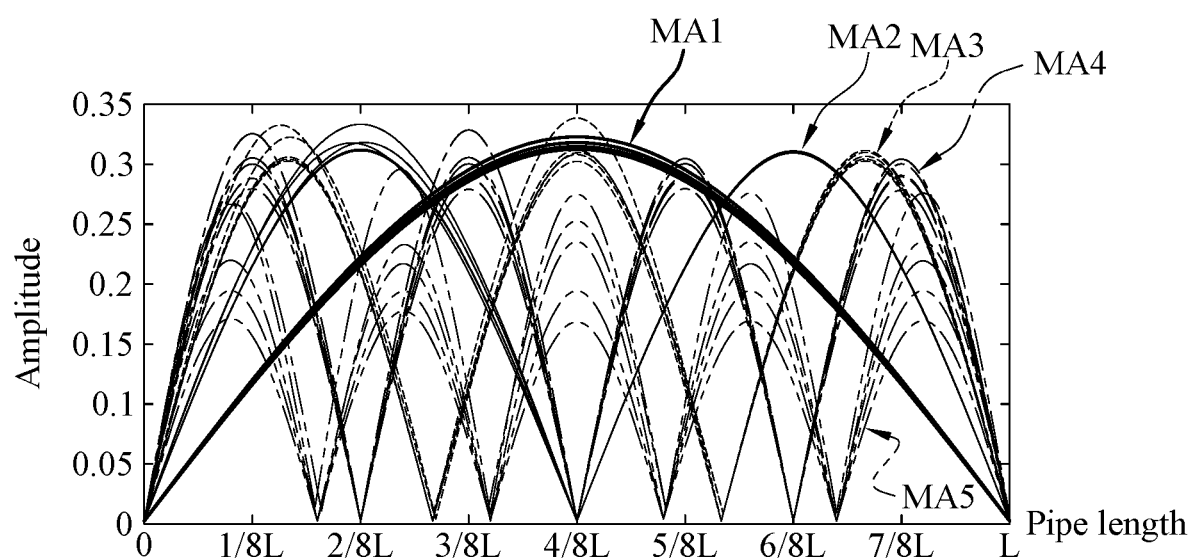
FIG. 9 is a waveform diagram of a plurality of comparison modal parameters stored in the database according to one embodiment of the present disclosure.

Please further refer to FIG. 9, which is a waveform diagram of a plurality of comparison modal parameters stored in the database according to one embodiment of the present disclosure. In this embodiment, each of the first actual modal parameters of the first subject structural unit TPB includes an amplitude value of a characteristic frequency (namely "natural frequency"). For example, the first actual modal parameters PB1-PB5 separately includes characteristic frequencies f1-f5 having amplitude values V1-V5 correspondingly.

Each of the plurality of the first comparison modal parameters MA1-MA5 corresponds to a plurality of first deterioration curves. Determining the degree and the position of the deterioration defect includes comparing each of the amplitude values of the characteristic frequencies to the first deterioration curves of each of the plurality of first comparison modal parameters, so as to determine the degree and the position of the deterioration defect. Each of the first deterioration curves corresponds to a predicted deterioration defect having a deterioration defect value and located in a position of the first subject structural unit TPB having the deterioration defect. The plurality of comparison modal parameters MA1-MA5 respectively corresponds to the first actual modal parameters PB1-PB5 of the first subject structural unit TPB.

In this embodiment, when the processor 20 obtains the amplitude value V1 of the characteristic frequency f1 included in the first actual modal parameter PB1, the processor 20 is capable of finding out a respective one of the first deterioration curves included in the comparison modal parameter MA1 stored in the database 30 shown in FIG. 9 according to the amplitude value V1 and the position where the sensor 20 is disposed at the first subject structural unit TPB. The predicted deterioration defect, corresponding to the first deterioration curve found by the processor 20, has a respective deterioration defect value and is located in a respective position of the first subject structural units TPB. The respective deterioration defect value and the respective position separately indicate a degree and a position of the deterioration defect existing in the first subject structural unit TPB.

Figure 10:
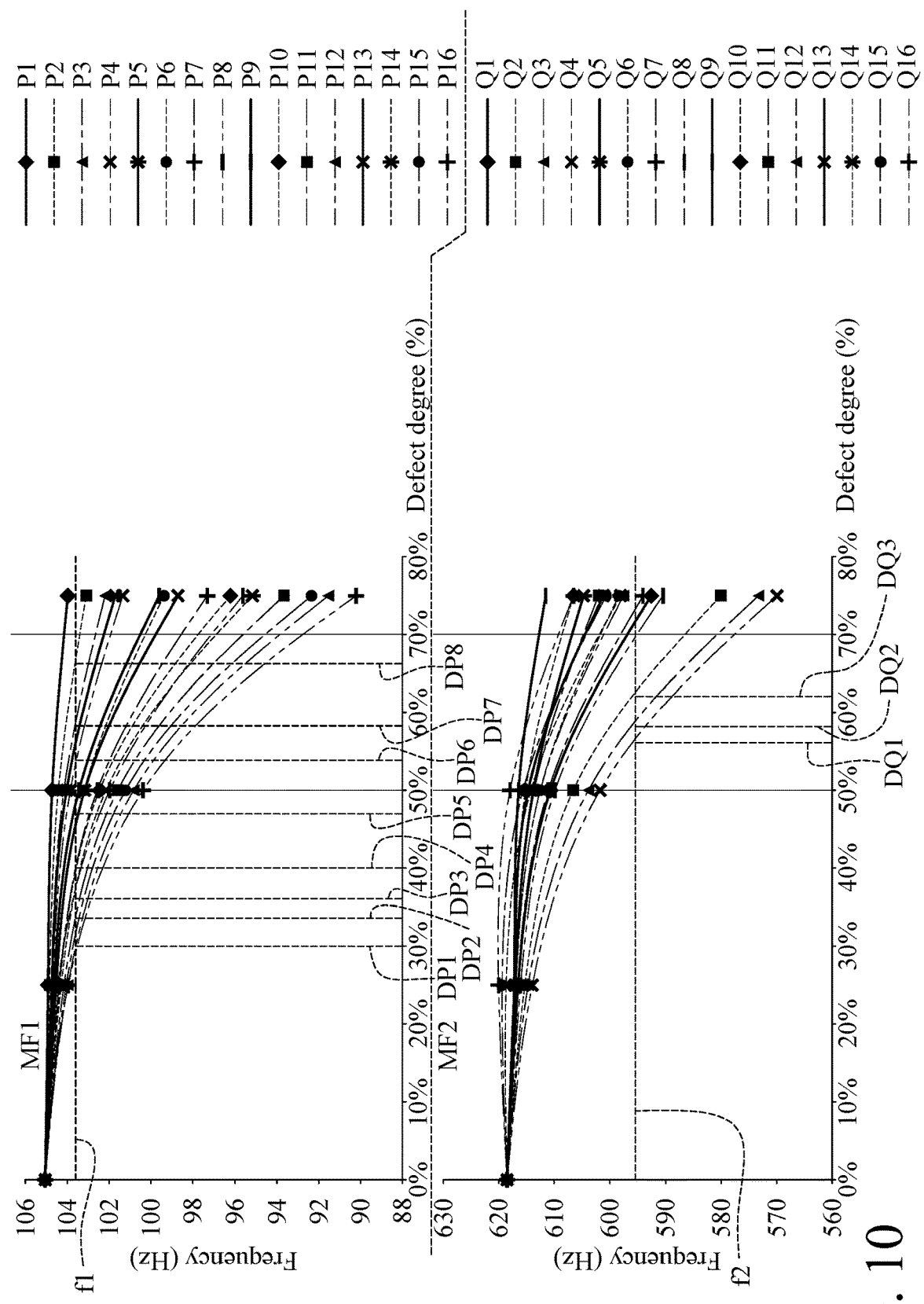
FIG. 10 is a waveform diagram of a plurality of comparison modal parameters stored in the database according to another embodiment of the present disclosure.

In the embodiment of FIG. 9, the degree and the position of the deterioration defect of the first subject structural unit TPB is found by using amplitude values of the same characteristic frequency. In another embodiment, the degree and the position of the deterioration defect of the first subject structural unit TPB is found by using variations of characteristic frequencies. Please further refer to FIG. 10, which is a waveform diagram of a plurality of comparison modal parameters stored in the database according to another embodiment of the present disclosure. In this embodiment, each of the first actual modal parameters of the first subject structural unit TPB includes a characteristic frequency. For example, the first actual modal parameters PB1-PB5 include the characteristic frequencies f1-f5 respectively. Each of the first comparison modal parameters includes a plurality of second deterioration curves. Determining the degree and the position of the deterioration defect includes obtaining at least two sets of predicted deterioration defect parameters according to the characteristic frequencies and the plurality of second deterioration curves included in the comparison modal parameters, and then determining the degree and the position of the deterioration defect according to the at least two sets of predicted deterioration defect parameters. In the embodiment of FIG. 10, it is indicated that two comparison modal parameters MF1 and MF2. The comparison modal parameter MF1 includes a plurality of second deterioration curve P1-P16, and the comparison modal parameter MF2 includes a plurality of second deterioration curves Q1-Q16. Each of the second deterioration curves indicates a deterioration degree regarding a respective defect length and a respective position with respect to a variety of frequencies.

For example, the second deterioration curve Q1 indicates the deterioration degree (%) of the first subject structural unit TPB regarding a defect length of 50 mm and a position of ⅛ of a pipe length with respect to a variety of frequencies. In another example, the second deterioration curve Q7 indicates the deterioration degree (%) of the first subject structural unit TPB regarding a defect length of 150 mm and a position of ⅔ of a pipe length with respect to a variety of frequencies. In this embodiment, the first actual modal parameters PB1 and PB2, obtained by the processor 20, respectively corresponds to the comparison modal parameters MF1 and MF2 stored in the database 16, and the first actual modal parameters PB1 and PB2 includes the characteristic frequencies f1 and f2 respectively. The processor 20 preliminary searches a possible position and a possible degree of the deterioration defect existing in the first subject structural unit TPB based on the characteristic frequency f1 and the second deterioration curves P1-P16 stored in the database 30 as shown in FIG. 10. Specifically, as shown in FIG. 10, the processor 20 obtains a set of predicted deterioration defect parameters including predicted deterioration defect parameters DP1-DP8 from the set of comparison modal parameters MF1. Similarly, the processor 20 obtains another set of predicted deterioration defect parameters including predicted deterioration defect parameters DQ1-DQ3 from the set of comparison modal parameters MF2. Further, the processor 20 is capable of determining a possible position and a possible degree of the deterioration defect existing in the first subject structural unit TPB according to the predicted deterioration defect parameters DP1-DP8 and the predicted deterioration defect parameters DQ1-DQ3. More specifically, in the embodiment, the processor 20 obtains the repeated predicted deterioration defect parameters, namely the predicted deterioration defect parameters DQ1-DQ3, by comparing the predicted deterioration defect parameters DP1-DP8 and the predicted deterioration defect parameters DQ1-DQ3. Accordingly, the processor 20 obtains information indicating that the position and the degree of the deterioration defect existing in the first subject structural units TPB are a position and a degree of a deterioration defect corresponding to one of the predicted deterioration defect parameters DQ1~DQ3.

In one embodiment, in the method for detecting deterioration defect of the structural part, each of the first actual modal parameters includes a characteristic frequency having a frequency in a first direction and a frequency in a second direction. The method for detecting deterioration defect of the structural part includes determining the form of the deterioration defect according to the frequency in the first direction and the frequency in the second direction. In one embodiment, the step of determining the form of the deterioration defect according to the frequency in the first direction and the frequency in the second direction includes the following steps: determining whether the frequency in the first direction is consistent with the frequency in the second direction; determining the form of the deterioration defect as an uniform defect when the frequency in the first direction is consistent with the frequency in the second direction; and determining the form of the deterioration defect as a partial defect when the frequency in the first direction is not consistent with the frequency in the second direction.

For example, the sensor 12, disposed at the first subject structural units TPB having the deterioration defect, is a triaxial accelerometer used for detecting frequencies in different directions, such as X-axis direction and Y-axis direction. Then, the processor 20 determines the form of the deterioration defect of the first subject structural unit TPB according to a variation of the frequency in X-axis direction and a variation of the frequency in Y-axis direction. The form of the deterioration defect could be a uniform defect or a partial defect. More specifically, in one embodiment, the step of determining the form of the deterioration defect by the processor 20 according to the frequency in the first direction and the frequency in the second direction includes the following steps: determining whether the variation of the frequency in the first direction is consistent with the variation of the frequency in the second direction; determining the form of the deterioration defect as an uniform defect when the variation of the frequency in the first direction is consistent with the variation of the frequency in the second direction; and determining the form of the deterioration defect as a partial defect when the variation of the frequency in the first direction is not consistent with the variation of the frequency in the second direction.

Based on the above descriptions, in the method for detecting deterioration defect of the structural part using the structural unit of the present disclosure, a proper base structural unit is defined so as to obtain the base modal parameters, and further actual modal parameters of each of the structural units of the structural part are obtained. The subject modal parameters are obtained by calculating based on the aforementioned actual modal parameters and predetermined ratios stored in the database and further compared to the base modal parameters. Therefore, it is possible to examine whether or not deterioration defects occur in structural units, so that the purpose of monitoring the overall structural part online is achieved. Furthermore, in the method of the present disclosure, any region of the overall structural part could be diagnosed by deriving a state of a pure structural unit using ratio relationships, so that the cost for building customized database is saved and intelligent diagnosis and experience sharing are improved.

What is claimed is:

1. A method for detecting deterioration defect of a subject structural part, comprising:
   defining a first base structural unit and obtaining N first base modal parameters of the first base structural unit;
   detecting M first subject structural units included in a subject structural part by M first sensors respectively disposed at the M first subject structural units, so as to obtain N first actual modal parameters of each of the M first subject structural units, wherein the each of the M first subject structural units is identical to the first base structural unit;
   obtaining M*N first predetermined modal parameters from M first simulated structural units, with each of the M first simulated structural units providing N of the M*N first predetermined modal parameters;
   dividing the N first base modal parameters respectively by the M*N first predetermined modal parameters to obtain M*N first predetermined ratios;
   calculating N first subject modal parameters of each of the M first subject structural units by a processor according to the N first actual modal parameters of each of the M first subject structural units and the M*N first predetermined ratios stored in a database, with the processor electrically connected to the M first sensors; and
   comparing the N first subject modal parameters of each of the M first subject structural units to the N first base modal parameters by the processor, so as to determine whether each of the M first subject structural units has a deterioration defect;
   wherein each of the M first simulated structural units is identical to the first base structural unit.

2. The method for detecting deterioration defect of the structural part according to claim 1, further comprising:
   obtaining the M*N first predetermined modal parameters from the M first subject structural units before a first time point, obtaining the N first actual modal parameters of the each of the M first subject structural units at a second time point, with the first time point prior to the second time point for a period of time.

3. The method for detecting deterioration defect of the structural part according to claim 1, further comprising:
   defining a second base structural unit and obtaining N second base modal parameters of the second base structural unit;
   detecting a second subject structural unit included in the subject structural part by a second sensor disposed in the subject structural part, so as to obtain N second actual modal parameters of the second subject structural units;
   calculating N second subject modal parameters of the second subject structural unit by the processor according to the N second actual modal parameters of the second subject structural unit and N second predetermined ratios stored in a database; and
   comparing the N second subject modal parameters of the second subject structural unit to the N second base modal parameters by the processor, so as to determine whether the second subject structural unit has a deterioration defect;
   wherein the N second predetermined ratios are related to the N second base modal parameters and N second predetermined modal parameters obtained from a second simulated structural unit, a structural type of the second simulated structural unit is identical to a structural type of the second base structural unit, and the structural type of the second base structural unit is different from the structural type of the first base structural unit.

4. The method for detecting deterioration defect of the structural part according to claim 1, further comprising:

comparing the N first actual modal parameters of one of the M first subject structural unit having the deterioration defect to first modal parameter information so as to determine a degree and a position of the deterioration defect when determining the first subject structural unit has the deterioration defect;

wherein the first modal parameter information comprises N first comparison modal parameters, each of the N first comparison modal parameters indicates a respective one of the deterioration defect of the position and other deterioration defects of other positions in the first subject structural unit.

5. The method for detecting deterioration defect of the structural part according to claim 4, wherein each of the N first actual modal parameters of the first subject structural unit having the deterioration defect comprises an amplitude value of a characteristic frequency, each of the N first comparison modal parameters corresponds to a plurality of first deterioration curves, and determining the degree and the position of the deterioration defect comprises comparing each of the amplitude values of the characteristic frequencies to the plurality of first deterioration curves of a respective one of the N first comparison modal parameters, so as to determine the degree and the position of the deterioration defect;

wherein each of the plurality of first deterioration curves corresponds to a predicted deterioration defect having a deterioration defect value and located in a position of the first subject structural unit having the deterioration defect.

6. The method for detecting deterioration defect of the structural part according to claim 4, wherein each of the N first actual modal parameters of the first subject structural unit having the deterioration defect comprises a characteristic frequency, each of the N first comparison modal parameters comprises a plurality of second deterioration curves, and determining the degree and the position of the deterioration defect comprises:

obtaining at least two sets of predicted deterioration defect parameters according to the characteristic frequencies and the plurality of second deterioration curves comprised in the N first comparison modal parameters; and determining the degree and the position of the deterioration defect according to the at least two sets of predicted deterioration defect parameters.

7. The method for detecting deterioration defect of the structural part according to claim 4, wherein each of the N actual modal parameters of the first subject structural unit having the deterioration defect comprises a characteristic frequency, the characteristic frequency has a first frequency in a first direction and has a second frequency in a second direction, the method for detecting deterioration defect of the structural part further comprise determining a form of the deterioration defect according to the first frequency in the first direction and the second frequency in the second direction.

8. The method for detecting deterioration defect of the structural part according to claim 7, wherein determining the form of the deterioration defect according to the first frequency in the first direction and the second frequency in the second direction comprising:

determining whether the first frequency in the first direction is consistent with the second frequency in the second direction;

determining the form of the deterioration defect as a uniform defect when the first frequency in the first direction is consistent with the second frequency in the second direction; and determining the form of the deterioration defect as a partial defect when the first frequency in the first direction is not consistent with the second frequency in the second direction.

* * * * *